July 1, 1924.  
G. W. BEYERLE  
AUTOMATIC OYSTER SHUCKER  
Filed Oct. 3, 1923

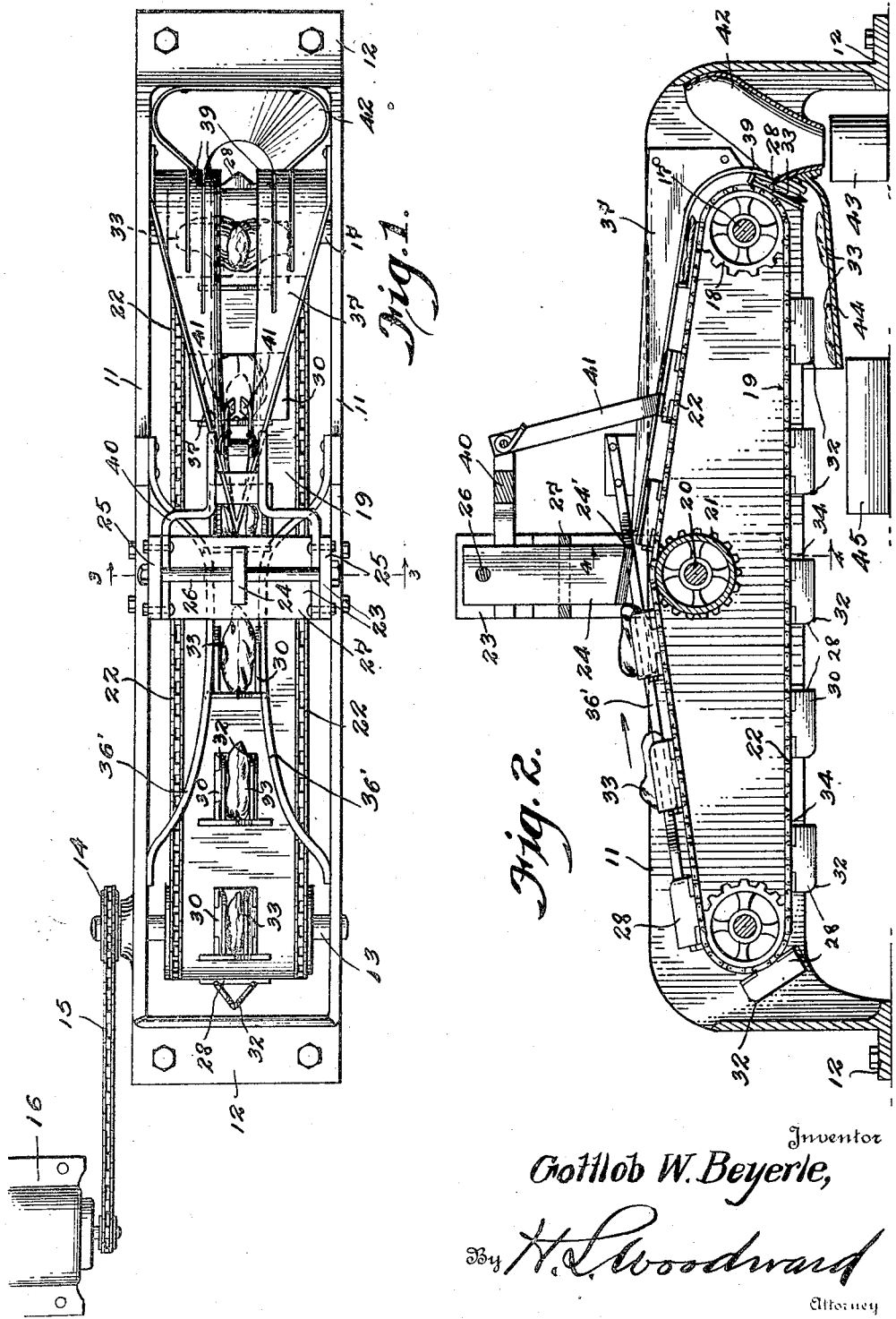

Inventor  
Gottlob W. Beyerle,  
By H. Woodward  
Attorney

Patented July 1, 1924.

1,499,965

UNITED STATES PATENT OFFICE.

GOTTLOB W. BEYERLE, OF DENVER, COLORADO.

AUTOMATIC OYSTER SHUCKER.

Application filed October 3, 1923. Serial No. 666,266.

*To all whom it may concern:*

Be it known that I, GOTTLOB W. BEYERLE, a citizen of the United States, residing at Denver, in the county of Denver and State of Colorado, have invented certain new and useful Improvements in Automatic Oyster Shuckers, of which the following is a specification.

The invention has for an object to present a machine for shucking oysters which will be simple to construct and operate, and which will function in a novel manner.

It is a purpose to present a machine which is adapted to operate on oysters of various sizes within a considerable range, as well as accommodating itself to various peculiar forms of bivalves. It is an object to provide a machine of this character which will open an oyster and cut the oyster itself free from the shell, and then deliver the oyster and the shell at different points.

It is an important object to present a novel means for feeding oysters to an opening device. Another purpose is to construct a novel individual oyster holding appliance, and means for insuring the secure gripping of the oyster, and its pressure against an opener knife. A further aim is to provide a novel means for opening the shells after initial engagement with a knife. A still further aim is to present a novel means for conveying the shells after removal of the oyster proper therefrom.

Additional objects, advantages and features of invention reside in the construction, arrangement and combination of parts involved, as will be readily understood from the following descriptions and accompanying drawings, in which, Figure 1 is a top view of a machine constructed in accordance with my invention, Fig. 2 is a longitudinal sectional view thereof, Fig. 3 is a cross section on the line 3—3 of Fig. 1.

Figure 3:
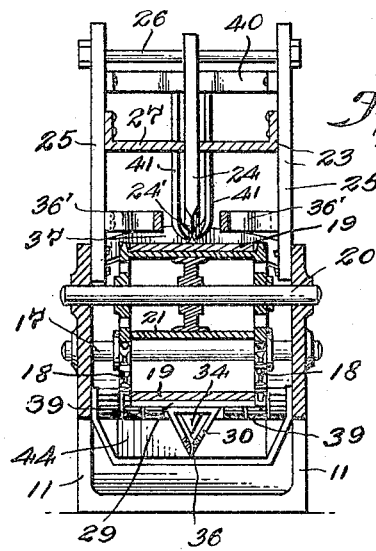
Figure 4:
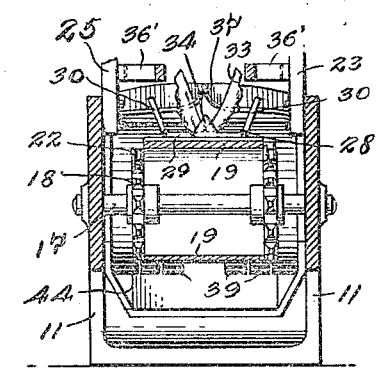
Fig. 4 is a cross section on the line 4—4 of Fig. 2.

There is illustrated a machine which comprises a box frame including two side members 11, and supporting feet 12 at the ends adapted to be bolted to a floor. Adjacent one end of the frame a transverse main shaft 13 is revolubly mounted in the side members, projecting from the frame at one side, and having a sprocket 14 thereon driven by a chain 15 from the motor 16 shown in Fig. 1. At the opposite end of the frame 10 a second shaft 17 is mounted in a corresponding position, the shafts having sprockets 18 thereon upon which an endless conveyor 19 is carried. Intermediately of the length of the frame 10 there is mounted a shaft 20 at a slightly higher level, and upon this there is mounted a drum or roller 21 of suitable length and diameter to support the conveyor 19 as required and more particularly described hereinafter. The roll 21 is provided with sprockets also, and the conveyor 19 includes chain elements 22 at the sides to insure proper support and movements as required.

Centrally over the frame 10 there is erected a knife mounting 23 carried by the side members of the frame, and by which a knife 24 is mounted vertically over the conveyor and in a plane coincident with the medial plane of the conveyor. The mounting 23 includes two side plates 25 carrying between then a removable shaft 26, the knife 24 comprising a suitable plate apertured at the upper part and receiving the shaft slidably for support. A horizontal plate 27 is also mounted between the plates 25 at an intermediate height, slotted to receive the knife snugly whereby the latter is securely positioned and held against displacement. The knife has a sharpened lower edge which is inclined downwardly in the direction of movement of the conveyor and the front side may also be sharpened, an obtuse penetrating point 24' being thus provided intended to effect initial entry of the knife into a shell brought properly thereagainst. The upper side of the conveyor moves to the right as viewed in Figs. 1 and 2.

Figure 5:
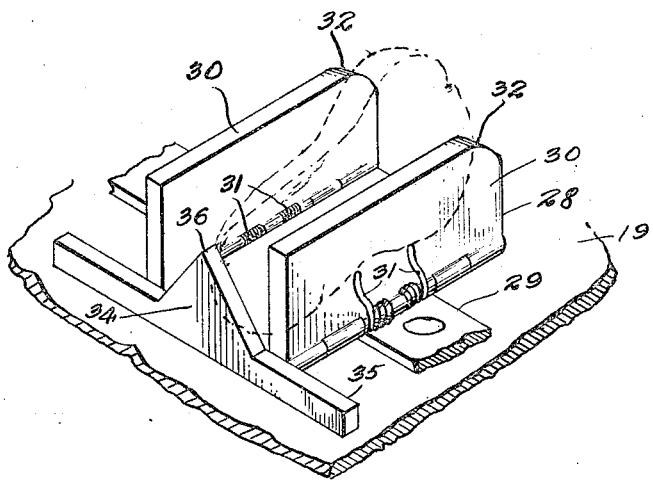
Fig. 5 is a detail perspective of the oyster gripper.

On the conveyor there is mounted a plurality of oyster grippers or shell carriers 28, each comprising a base plate 29 secured to the conveyor in a suitable manner, and having hinged clamp plates 30 at the sides, spring-pressed by light springs 31 (see Fig. 5) tending to force them inward as shown at the extreme left in the ascending part of the conveyor in Fig. 1. The forward ends of the plates are rounded as at 32 so as to diverge from each other when near together, thus permitting an oyster shell 33 to be easily forced between them from the front causing separation of the plates so as to accommodate the oyster, and the light springs of the plates will serve to retain the oyster as positioned until the plates 30 are engaged by a high pressure device as will be described. The plate 29 is formed at the rear with an upstanding pusher plate or flange 34 having low lateral parts 35, and a central higher part 36. Mounted upon the inner sides of the frame members 11 there are high pressure bars 36', their ends in the direction of movement of the conveyor being securely fixed upon the members 11 while their opposite ends rest slidably against the members 11. These bars are curved so as to converge from their slidable ends toward the knife, and adjacent the latter they come into such position as to bear slidably upon the clamp plates 30, so as to press the latter firmly upon oysters of any thickness.

Toward the rear of the machine there is mounted a spreader 37, including rectilinear members arranged in V-shape, the point being located immediately adjacent the knife, and their outer ends secured to the members 11 adjacent the shaft 17. At the apex of the spreader the forward edge is inclined and positioned so as to strike an oyster at the same point where the knife point 24' entered. The spreader is also elevated sufficiently above the conveyor to avoid damaging an oyster in a shell during its operation thereon. At their rearward parts the members of the spreader are provided with yieldable guide bars 39 adapted to lie over the respective sides of an opened oyster while being moved rearwardly thereunder, these bars being extended downwardly around the conveyor, so as to retain an oyster until moved inwardly under the conveyor a distance. Upon brackets 40, oyster-cutters 41 are mounted, extending downwardly within the spreader 37, at a location to engage the inner sides of the two members of a shell after partial spreading, and cut the oyster from the eye. The lower ends of the cutters are curved so as to engage properly the inner surfaces of the shells, and are also yieldable so as to accommodate themselves to the convergent surfaces engaged. At the rear of the machine, a hopper 42 is located so as to receive the oysters proper, and a receptacle 43 may be set removably thereunder. A chute 44 is also mounted to receive shells discharged from the bars 39, and guide them to a separate receptacle 45.

In the operation of the machine, an operative with a hamper of oysters stands beside the machine at the forward end, and successively thrusts oysters between the clamp plates 30 with the hinge ends of the oysters abutting the pusher plates 34. The oysters are then carried rearwardly and forced against the knife, the point 24' of which will enter between the two halves, either at their line of contact, or by penetration of one shell close to the junction. The penetration, once accomplished will cause the knife in the remainder of its movement through the shell to follow the line of contact of the two half shells, the shell accommodating itself thus, automatically. The knife is of sufficient thickness to also spread the shell slightly, enough to permit entry of the spreader immediately thereafter, and when engaged by the spreader, the shell is turned so that its hinge lies next the conveyor, while the two sides of the shell are spread apart finally, lying upon the conveyor like an open book. When the cutters 41 have operated, the oyster proper falls back upon the shell or upon the conveyor, and when it is carried to the rear end, falls into the hopper 42, together with some juices. The shell is carried to the chute 44 on the bars 39 of the spreader, as indicated.

Any shell particles which may be delivered with the oysters proper, may be separated by vibration of the holding receptacle until the particles settle to the bottom.

In the movement of the shell after spreading, the lateral extensions of the pusher plate become effective in pressing the shells forward under rearward movement under the bars 39.

The machine will be seen to be of extremely simple construction, readily understood in its operation, and easily tended, as well as produced at a low cost.

What is claimed:—

1. A shucking machine for bivalves comprising an endless conveyor, a penetrating knife fixed close thereto, shell carriers on the conveyor adapted to center shells with respect to the knife and transmit force from the conveyor to push the shells against the knife for penetration, shell-spreading means associated with the knife, and means to separate oysters from their shells.

2. The structure of claim 1 in which the spreader device comprises bars arranged in a V-shape with the apex close behind the knife.

3. The structure of claim 1 in which the means to separate oysters from their shells comprises curved blades resiliently mounted within the spreader and positioned to slide upon the inner sides of a partly spread shell while advancing theretoward.

4. The structure of claim 1 in which the carriers comprise base portions and hinged plates at the sides, resilient means tending to bear the plates together, and a follower plate to bear upon an oyster shell between the plates.

5. The structure of claim 4 in which the hinged plates have divergent forward parts permitting thrusting of an oyster therebetween from the direction of the knife.

6. The structure of claim 4 in which heavy spring bars are mounted at opposite sides of the path of the carriers, convergent so as to engage the hinged plates to hold an oyster firmly during engagement with the knife.

7. The structure of claim 1 in which retainer bars are mounted close to the conveyor rearwardly of the spreader to receive the spread shells thereunder for sliding movement thereon to a point of discharge.

8. The structure of claim 7 in which the conveyor is constructed to discharge oysters proper in advance of the discharge of the shells.

In testimony whereof I have affixed my signature in presence of two witnesses.

GOTTLOB W. BEYERLE.

Witnesses:
  ALICE M. DWYER,
  O. L. WESTON.